(12) United States Patent
Kosmehl

(10) Patent No.: US 11,953,107 B2
(45) Date of Patent: Apr. 9, 2024

(54) VALVE

(71) Applicant: Leinemann GmbH & Co. KG, Braunschweig (DE)

(72) Inventor: Ralf Kosmehl, Lehrte (DE)

(73) Assignee: LEINEMANN GMBH & CO. KG, Braunschweig (DE)

(*) Notice: Subject to any disclaimer, the term of this patent is extended or adjusted under 35 U.S.C. 154(b) by 0 days.

(21) Appl. No.: 18/056,120

(22) Filed: Nov. 16, 2022

(65) Prior Publication Data

US 2023/0160483 A1 May 25, 2023

(30) Foreign Application Priority Data

Nov. 24, 2021 (DE) .................. 10 2021 130 841.0

(51) Int. Cl.
*F16K 17/19* (2006.01)
*F16K 15/02* (2006.01)

(52) U.S. Cl.
CPC ............ *F16K 15/028* (2013.01); *F16K 17/19* (2013.01)

(58) Field of Classification Search
CPC ....... F16K 1/42; F16K 2200/102; F16K 17/19
USPC ........................................................ 251/174
See application file for complete search history.

(56) References Cited

U.S. PATENT DOCUMENTS

| | | | | |
|---|---|---|---|---|
| 2,882,009 A | * | 4/1959 | Bryant ................. | F16K 3/0227 251/174 |
| 3,583,426 A | | 6/1971 | Feres | |
| 3,870,071 A | * | 3/1975 | Graham ................. | F16K 15/03 251/177 |
| 3,945,395 A | * | 3/1976 | Reinicke ............... | F16K 17/168 137/493 |
| 4,815,699 A | | 3/1989 | Mueller | |
| 5,101,853 A | | 4/1992 | Mailliet et al. | |
| 5,580,031 A | * | 12/1996 | Lorch ...................... | F16K 1/42 251/266 |

FOREIGN PATENT DOCUMENTS

| | | |
|---|---|---|
| AT | 206290 B | 11/1959 |
| DE | 1960941 U | 5/1967 |
| DE | 205226 A1 | 12/1983 |
| DE | 3317018 A1 | 9/1984 |
| EP | 3431840 A1 | 7/2017 |
| GB | 782851 A | 12/1957 |

* cited by examiner

*Primary Examiner* — Kevin F Murphy
(74) *Attorney, Agent, or Firm* — WC&F IP

(57) ABSTRACT

A valve with a valve seat and a valve disk has the valve disk configured such that it can be brought into a first position in which it is in contact with the valve seat where the valve is closed, and can be brought into a second position in which the valve is open. The valve has at least one spring element, and the valve seat can be displaced against a force exerted by the at least one spring element by bringing the valve disk from the second position into the first position and thereby deforming the spring element.

14 Claims, 2 Drawing Sheets

VALVE

FIELD OF THE INVENTION

The invention relates to a valve with a valve seat and a valve disk, which can be brought into a first position, in which it is in contact with the valve seat and the valve is closed, and into a second position in which the valve is open.

BACKGROUND

Such valves are produced in a range of sizes and for various applications and types of use, and have been known from the prior art for many years. The valve disk can be shifted from the second position, in which the valve is open, into the first position by moving it towards the valve seat. When it comes into contact with the valve seat, the valve closes. To bring the valve disk from the first position, i.e. the closed valve, into the second position, it is shifted in the opposite direction, i.e. moved away from the valve seat.

Such valves are used, for example, with storage containers, such as tanks, or lines, such as pipelines, and the required fittings and extensions, in which a fluid, such as a liquid or a gas, is stored or through which such a fluid is conducted. Such a valve can be used to adjust and influence the flow volume that is passed through the line, for example, or that is admitted to or discharged from the storage tank through the valve. Such valves can therefore be used, in particular, as emergency valves, for example to stop the flow of the fluid out of a container or tank if, for example, there is a defect or technical issue in a connected line. In this case, the valve, which is usually in the open position in which the valve disk is in the second position, is closed. To this end, the valve disk is brought from the second position into the first position.

In this and also other applications, it is important that as little fluid as possible, ideally none at all, can pass through the valve when the valve disk is in the first position. It is therefore advantageous to establish a contact between the valve disk and the valve seat that is as tight as possible.

In many applications, the valve seat is connected to a flange by way of which at least the valve seat, but where applicable the entire valve, is fixed to another component, such as a wall of a container or a pipe, for example its end. Particularly in large valves where the valve seat has an inner diameter of, for example, more than 15 cm, preferably 30 cm, preferably more than 40 cm, especially preferably more than 50 cm, for instance 60 cm, such a flange is fixed to the respective other component by multiple screws or attachment elements. During assembly, the tightening torque of the screws or attachment elements may cause a deformation of the flange which may be transferred to the valve seat, especially if the valve seat is directly connected to the valve, for example by means of a weld seam or in the case of parts cast as a single piece. The flange deforms to compensate the settlement phenomenon. These deformations of the valve seat can increase leakage, i.e. the amount of fluid that can pass through the valve when the valve is closed. This adversely affects the quality of the valve.

The prior art therefore includes valves with a valve disk designed to be elastic and deformable. Such a valve is known from U.S. Pat. No. 3,394,732 or U.S. Pat. No. 5,048,560, for example. Alternative embodiments are distributed, for example, by the company "Shang & Jurs" or the company "Pentair" under the name "Expanda-Seal".

In particular, this poses a disadvantage if the fluid whose flow is to be prevented exhibits, for example, poisonous, corrosive, flammable or other properties that can have a negative impact on the surroundings or the environment. By preventing this, the present invention makes a valuable contribution to environmental and climate protection, especially in such cases.

SUMMARY

The invention therefore aims to improve a valve of the type described above in such a way that the sealing effect is improved.

The invention solves the addressed issue by way of a valve that comprises at least one spring element, wherein the valve seat can be displaced against a force applied by the at least one spring element in that the valve disk is brought from the second position into the first position, causing the spring element to deform.

Unlike valves from the prior art, the actual valve seat, which comes into contact with the valve disk when the valve is closed, is arranged relative to a flange or another component of the valve other than the valve disk such that it can be displaced. When the valve is in the open position, i.e. the valve disk is in the second position and not in contact with the valve seat, the valve seat is in the basic position. In this basic position, the at least one spring element is relaxed as far as is possible due to the structural conditions of the valve. In certain embodiments, the spring element is completely relaxed. Regardless of whether the spring element still has stored potential energy in this position and situation, it is preferably not possible for it to release further potential energy and reach an even more relaxed state. For the valve seat, this means that its basic position is the position in which it is displaced furthest towards the valve disk. A further displacement of the valve seat towards the valve disk from the basic position is preferably not possible.

If the valve is now closed from this position, i.e. the valve disk is brought from the second position into the first position, the distance between the valve disk and the valve seat continuously reduces until the valve disk comes into contact with the valve seat. At this moment, however, the first position of the valve seat has not yet been reached. Rather, the valve disk is displaced further, thereby also displacing the valve seat and the spring element being charged with potential energy in the process. This means that the displacement of the valve seat together with the valve disk occurs against a force generated by the at least one spring element. When the valve disk is brought from the second position into the first position, it partially overcomes the force generated by the spring element and deforms the spring element. The valve disk preferably compresses the spring element in the process. As a result, the force generated by the spring element increases. Deformation ends when the force generated by the valve disk that acts on the valve seat and therefore also on the spring element corresponds to the force generated by the spring element and an equilibrium of forces sets in or a further displacement of the valve disk and/or valve seat is not possible due to an end stop. The first position of the valve seat is reached at this moment.

Consequently, a force is applied to the valve seat that is directed towards the valve disk and, when a flange deforms due to tightening torques of attachment elements, ensures the most effective possible contact between the valve disk and the valve seat.

Preferably, the spring element comprises at least one elastic component, for example made of a rubber-elastic compound, and/or at least one bellows, for example made of a plastic or a metal. The material that is used for the spring element is preferably selected depending on the fluid that the spring element comes into contact with when the valve is used.

The valve seat preferably features an end stop on which the valve disk rests when the valve disk is in the first position. Without such an end stop, the valve disk would be displaced from the second position in which the valve is open until the force applied by the spring element is equal to the force exerted by the valve seat, which is determined, for example, by the weight force of the valve seat, any spring loads that may be present, and before stresses used to achieve the fastest possible closing of the valve and a pressure exerted by the fluid. This force can become very large, especially with large valve disks, and in this case require a very strong spring element. These usually require considerable installation space and material, meaning they are correspondingly cost-intensive. Such a large force exerted by the spring element is often not necessary to achieve a sufficient sealing effect between the valve seat and valve disk.

In such situations, it is advantageous if the valve disk, when moving from the second position into the first position, does move the valve seat against the force applied by the spring element, but after a certain length of travel it strikes or rests against the end stop, which then prevents further movement. Most of the force exerted by the valve disk is then absorbed and dissipated by the end stop, and only a force large enough to obtain a sufficiently tight effect is exerted by the spring element.

The end stop is preferably designed to be ring-shaped. In a preferred embodiment, the end stop is a ring-shaped elevation or a very short pipe, the length of which is considerably smaller than its diameter. The one end of this pipe acts as an end stop surface on which the valve disk rests when it is in the first position. At the opposite second end of this pipe there is preferably a flange that protrudes radially above the ring-shaped end stop. This projection preferably features a plurality of bores that can be brought into overlap with bores on another component in order to fix the flange to the other component using attachment elements, such as screws.

Preferably, the at least one spring element is also designed to be ring-shaped and is arranged on the end stop. This ensures that a force is exerted by the spring element onto the valve seat across the entire circumference of the end stop and especially preferably across the entire circumference of the valve seat when the valve disk is in the first position. Alternatively, the spring element is not designed to be ring-shaped. In this case, it preferably features a plurality, for example at least 3, at least 4, at least 6 or at least 16, individual elements that are distributed across the circumference of the valve seat and/or across the circumference of the end stop. It is particularly preferable if the individual elements are arranged equidistantly.

Preferably, the at least one spring element is arranged radially on the outside of the end stop. This position is especially advantageous if the valve is largely open. The fluid then flows through the ring-shaped end stop and the ring-shaped valve seat, and is not adversely affected—or only to a small extent—by the spring element arranged radially outside.

Alternatively, the at least one spring element is arranged radially on the inside of the end stop. This is always advantageous if the valve is largely closed. Ideally, no fluid flows through the valve in this state. However, due to manufacturing tolerances and free play, complete prevention of such flow cannot be achieved. Nevertheless, the amount of fluid that flows through the valve in this state is very small.

Preferably, the valve features a flange and is designed in such a way that a deformation of the flange caused by attaching the flange to a component does not lead to a deformation of the valve seat. Such deformations occur if the flange is mounted by means of attachment elements, such as screws, on the component that does not constitute part of the valve, but is perhaps a pipeline, for example. The flange is preferably designed to be circular or rectangular, for example quadratic. Of course, other geometric shapes of the flange are also possible.

The deformation of the flange is preferably compensated by the at least one spring element. It is especially preferable if the flange and valve seat are designed to be tension-decoupled.

In a preferred embodiment, the elasticity of the spring element is higher than the elasticity of the valve seat. Particularly preferably, it is at least twice as high. The elasticity of the valve seat and of the valve disk preferably deviate from one another by less than 20%, preferably less than 10%. Particularly preferably, the elasticity of the valve disk and of the valve seat are equal.

DESCRIPTION OF THE DRAWINGS

In the following, a number of embodiment examples of the invention will be explained in more detail with the aid of the accompanying drawings. They show.

DETAILED DESCRIPTION

Figure 1:
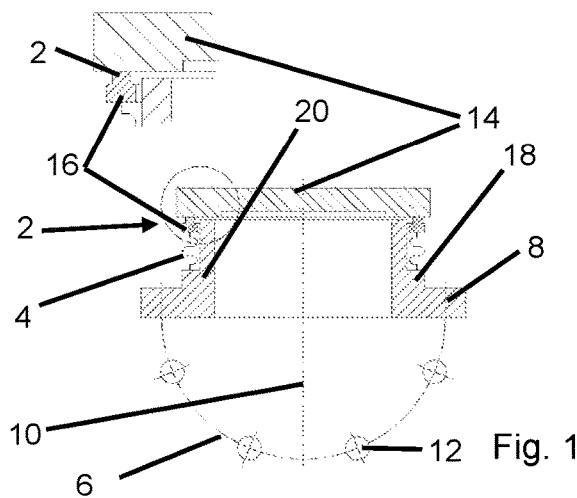
FIGS. 1-8 schematic sectional views through valves of different embodiments of the invention, FIG. 9 a schematic sectional view through a valve in the mounted state and FIG. 10 the valve from FIG. 1 in the open state.

FIGS. 1 to 8 show sectional views through valves of different embodiments of the invention. They all have a valve seat 2 that is depicted on a valve seat support 16. An enlarged version of this is shown in the small section in the upper left area of FIG. 1 that corresponds to the content of the circle. In the embodiment examples shown, it is a ring-shaped, preferably circular ring-shaped, element that surrounds a flow opening of the valve. Below the actual sectional views, the partial circle 6, shown with a dashed line, illustrates that the valve and the valve seat 2 are designed to be rotationally symmetrical. This is advantageous, but not essential. Angular, for example rectangular, valves are also known. At the lower end of the valve seat 2 is a flange 8 that protrudes radially in relation to the longitudinal axis 10 of the valve. The partial circle 6 contains elements 12 that demonstrate that the flange 8 is equipped with bores at particular intervals through which attachment elements, such as screws, can be guided in order to arrange the flange 8 and therefore the valve on another component. Above the valve seat 2 is a valve disk 14 on which a valve seat support 16 is situated. The spring element 4 rests on it.

All of these components and elements feature in all valves shown in FIGS. 1 to 8 and function in the same way. Therefore, a detailed description will be omitted in the following. Instead, the differences in the individual valves will be described.

In FIG. 1, the upper end of the spring element 4 comprises a valve seat support 16 which, in the embodiment example shown, rests on the valve disk 14, thereby preventing the fluid from being able to penetrate into the valve seat 2 and leave the valve through it. The valve is closed. The opposite end of the spring element 4 rests on a step 18, which is positioned directly above the flange 8 in the embodiment example shown. In the embodiment example depicted in FIG. 1, the spring element is designed as a relatively short bellows with a curved fold.

The valve seat 2 also has an end stop 20 designed as a ring-shaped element. The valve is depicted in the closed position, as the valve seat 2 arranged on the valve seat support 16 rests on the valve disk 14. The gap depicted between the valve disk 14 and the end stop 20 is only there for clarity.

Figure 2:
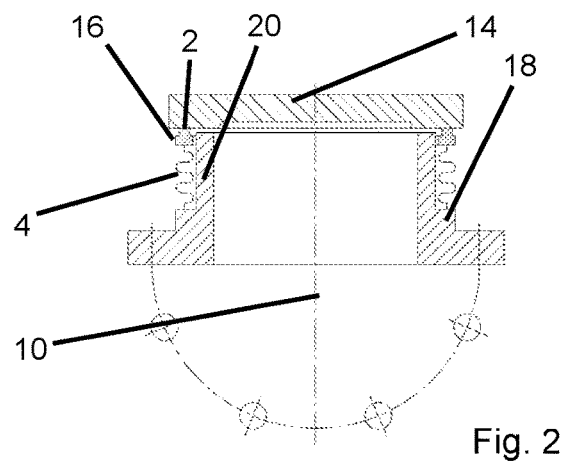

The valve illustrated in FIG. 2 differs from the valve depicted in FIG. 2 in that it has a different spring element 4. It also rests between the valve seat support 16, on which the valve seat 2 is arranged, on the valve disk 14 and on the step 18, but is designed to be longer in the axial direction in relation to the longitudinal axis 10. Again, the spring element 4 is designed as a bellows, but now features two folds, designed to be curved. The valve also has a longer end stop in the axial direction. However, the mode of operation corresponds to that of the valve in FIG. 1.

Figure 3:
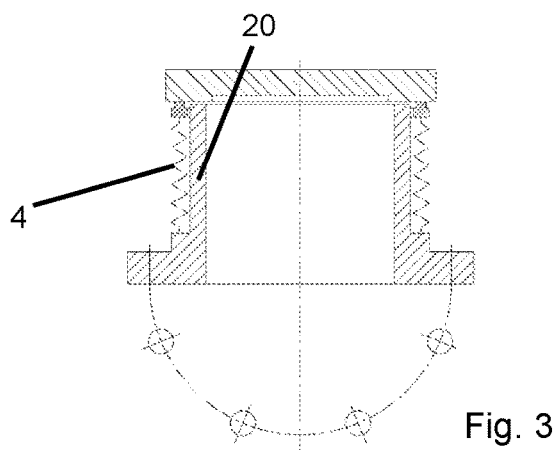

FIG. 3 depicts a valve which, in comparison to the valve shown in FIG. 2, features a longer end stop 20 in the axial direction and therefore also a longer spring element 4. Unlike in FIGS. 1 and 2, this is not designed to have curved folds, but pleated folds. This results in a different spring effect, for example a different spring characteristic or spring constant than in the design shown in FIGS. 1 and 2, even if all other parameters, such as the material used, the thickness and length, remain the same.

Figure 4:
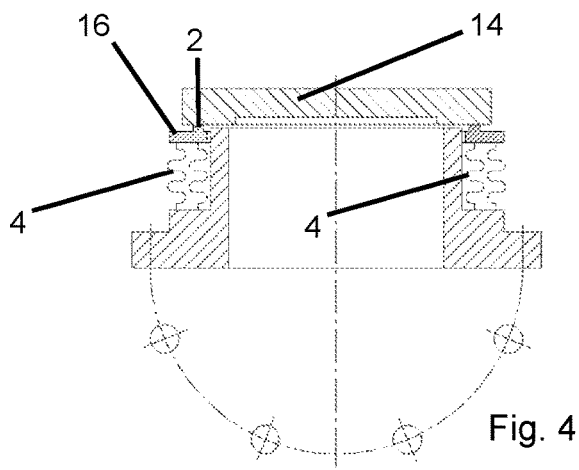

FIG. 4 depicts a valve with two spring elements 4. In the embodiment example shown, they are arranged concentrically to each other. Both are connected to the valve seat support 16. In the situation shown, the valve seat 2 rests on the valve disk 14, thereby closing the valve. By using more than one spring element 4, it is especially easy to enhance the spring force in comparison to the valve design shown in FIG. 1, for example. To do so, identical spring elements can be used, as in FIG. 4, or different spring elements.

Figure 5:
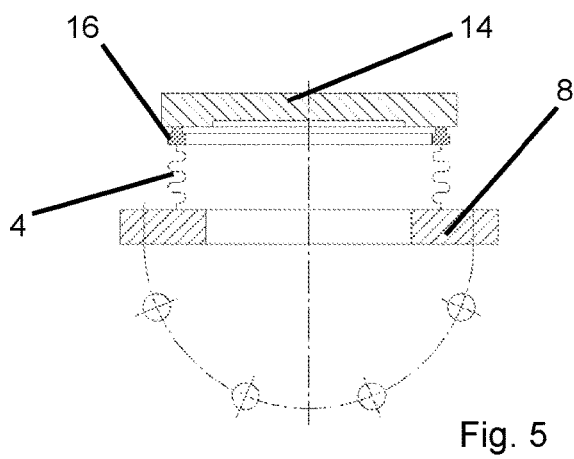

FIG. 5 shows a sectional view through a valve that does not have an end stop 20. The spring element 4 rests with the lower end in FIG. 5 against the flange 8 and features the valve seat support 16 at the upper end, on which the valve seat 2 is arranged, which rests against the valve disk 14. In this configuration, the valve disk 14 is moved downwards in the closed position until the weight force acting on the valve disk 14, where applicable a pressure exerted by a fluid, and the spring force of the spring element 4 reach an equilibrium of forces.

Figure 6:
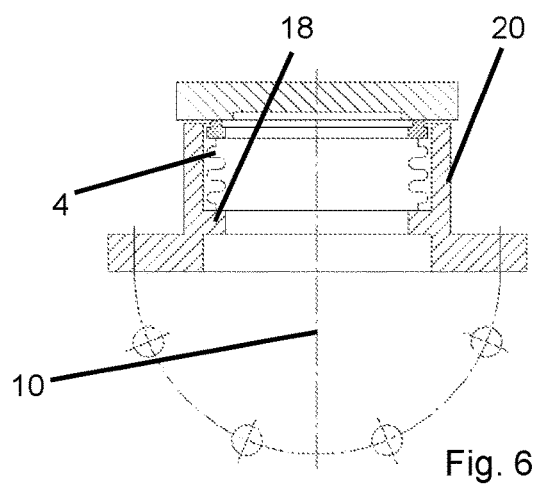

FIG. 6 depicts a valve with one end stop 20. Unlike the valves illustrated in FIGS. 1 to 4, the step 18 on which the spring element 4 rests does not protrude radially outwards, but radially inwards. In relation to the longitudinal axis 10 of the valve, the spring element 4 is arranged radially inwards and, like the other valves shown, features the valve seat support 16.

Figure 7:
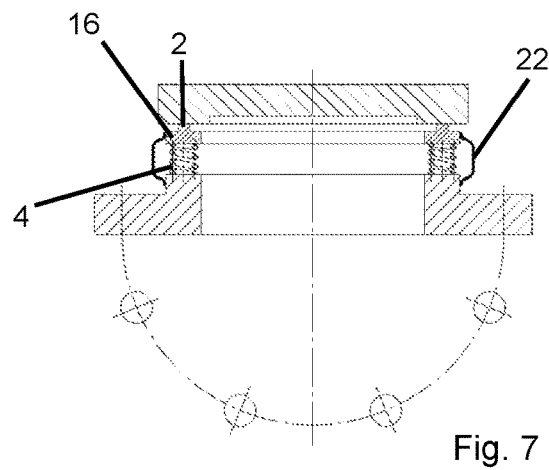

FIG. 7 depicts a valve with another type of spring element 4. Instead of the bellows shown so far, the valve in FIG. 7 has a series of coil springs, two of which are shown. Several of these spring elements 4 are distributed across the circumference to generate the desired spring force. Unlike a bellows, such spring elements 4 are not suitable for sealing the valve against a medium or fluid flowing towards it from the outside or inside. Therefore, a sealing jacket 22 is arranged radially outside the spring elements 4 in relation to the longitudinal axis 10. However, it may also be arranged radially inside the spring elements 4 in relation to the longitudinal axis.

Figure 8:
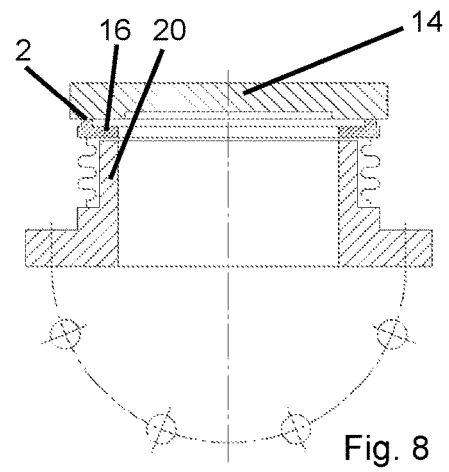

In particular, the valve according to FIG. 8 differs from the valves depicted thus far in that it has a different valve seat support 16. In the valves depicted thus far, which have an end stop 20, this is arranged either radially inside the end stop 20 or radially outside the end stop 20. In contrast to this, the valve according to FIG. 8 is arranged such that it is arranged between the end stop 20 and the valve disk 14 and comes into contact with the end stop 20 when the valve is closed and the valve seat 2, which is arranged on the valve seat support, is in contact with the valve disk 14.

Figure 9:
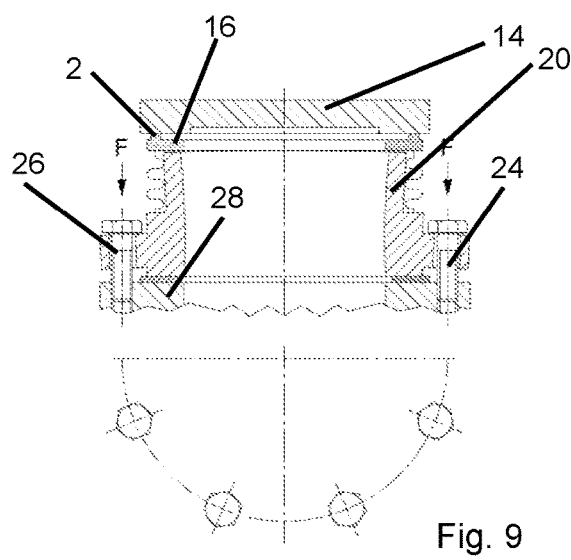

FIG. 9 depicts a schematic sectional view through the valve according to FIG. 8 in the mounted state. Screws 26 are guided through the bores 24 in the flange 8 to fix the valve to another component 28. In the process the screws 26 are tightened, leading to a deformation of the end stop 20, which is exaggerated and not shown to scale for better visibility. If the sealing effect of the valve depended on the effectiveness of the contact between the end stop 20 and the valve disk 14, this deformation would cause a leakage and impair the sealing effect of the valve. The valve seat support 16 and therefore also the valve seat 2 arranged thereon, however, are not deformed by tightening the screws 26. Its contact with the valve disk 14 is crucial for the tightness of the valve and is not negatively affected.

Figure 10:
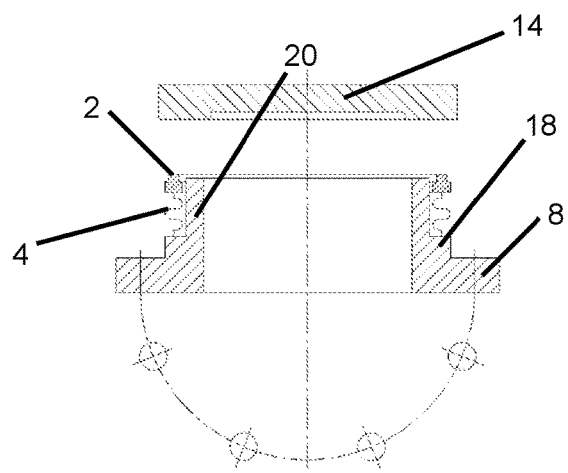

FIG. 10 depicts the valve from FIG. 1 in the open state. The valve disk 14 has been removed from the valve seat 2, i.e. brought from the first position shown in FIG. 1 into the second position.

REFERENCE LIST

2 valve seat
4 spring element
6 partial circle
8 flange
10 longitudinal axis
12 element
14 valve disk
16 valve seat support
18 step
20 end stop
22 sealing jacket
24 bore
26 screw
28 component

The invention claimed is:

1. A valve mountable on an external component, comprising:
 a valve seat comprising a first part configured to be contactable with a valve disk, wherein in a first position the valve disk is in contact with the first part of the valve seat and the valve is closed, and wherein in a second position the valve disk is positioned such that the valve is open;
 at least one spring element, wherein the first part of the valve seat is displaceable against a force exerted by the at least one spring element by bringing the valve disk from the second position into the first position and thereby deforming the spring element; and
 a flange configured for attachment to the external component, wherein the flange comprises a plurality of bores configured to receive screws or other attachment elements, and wherein the flange is configured to deform when subjected to external forces from the attachment, wherein the valve seat is configured such that a deformation of the flange caused by attaching the flange to the external component does not lead to a deformation of the first part of the valve seat.

2. The valve according to claim 1, wherein the at least one spring element comprises at least one elastic component, and/or at least one bellows.

3. The valve according to claim 2, wherein the at least one elastic component is made from a rubber-elastic compound and the at least one bellows is made of a plastic or a metal.

4. The valve according to claim 1, wherein the valve seat comprises a second part which is an end stop on which the valve disk rests when the valve disk is in the first position, wherein the end stop is distinct from the first part of the valve seat.

5. The valve according to claim 4, wherein the end stop is ring-shaped.

6. The valve according to claim 5, wherein the at least one spring element is arranged radially outside on the end stop.

7. The valve according to claim 5, wherein the at least one spring element is arranged radially inside on the end stop.

8. The valve according to claim 1, wherein the flange is circular or rectangular.

9. The valve according to claim 1, wherein deformation of the flange is compensated by the at least one spring element.

10. The valve according to claim 1, wherein the at least one spring element has an elasticity that is higher than an elasticity of the valve seat.

11. The valve according to claim 10, wherein the elasticity of the at least one spring element is at least twice as high as the elasticity of the valve seat.

12. The valve according to claim 1, wherein the valve seat has an elasticity and the valve disk has an elasticity, and wherein the elasticity of valve seat and the elasticity of the valve disk deviate from each other by 20% or less.

13. The valve according to claim 12, wherein the elasticity of the valve seat and the elasticity of the valve disk deviate from each other by 10% or less.

14. The valve according to claim 12, wherein the elasticity of the valve seat and the elasticity of the valve disk are equal.

* * * * *